US012597118B2

(12) United States Patent
Ikeda

(10) Patent No.: US 12,597,118 B2
(45) Date of Patent: Apr. 7, 2026

(54) IMAGE INSPECTION APPARATUS, IMAGE INSPECTION METHOD, AND IMAGE INSPECTION PROGRAM

(71) Applicant: KONICA MINOLTA, INC., Tokyo (JP)

(72) Inventor: Makoto Ikeda, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 448 days.

(21) Appl. No.: 17/366,548

(22) Filed: Jul. 2, 2021

(65) Prior Publication Data

US 2021/0407068 A1      Dec. 30, 2021

Related U.S. Application Data

(63) Continuation of application No. 16/546,721, filed on Aug. 21, 2019, now Pat. No. 11,074,683.

(30) Foreign Application Priority Data

Oct. 5, 2018      (JP) .................................. 2018-189915

(51) Int. Cl.
*G06T 7/13*            (2017.01)
*G06T 7/00*            (2017.01)

(52) U.S. Cl.
CPC ................ *G06T 7/001* (2013.01); *G06T 7/13* (2017.01); *G06T 2200/28* (2013.01);
(Continued)

(58) Field of Classification Search
None
See application file for complete search history.

(56)                      References Cited

U.S. PATENT DOCUMENTS 5,392,137  A      2/1995   Okubo
5,970,183  A      10/1999  Amemiya et al.
(Continued)

FOREIGN PATENT DOCUMENTS

JP          H08320923  A      12/1996
JP          2001209798  A       8/2001
(Continued)

OTHER PUBLICATIONS

Office Action (Notice of Reasons for Refusal) issued Oct. 3, 2023, by the Japan Patent Office in corresponding Japanese Patent Application No. 2022-171331 and an English translation of the Office Action (22 pages).

(Continued)

*Primary Examiner* — Tsung Yin Tsai
(74) *Attorney, Agent, or Firm* — BUCHANAN, INGERSOLL & ROONEY PC

(57)                      ABSTRACT

An image inspection apparatus includes an image reader that reads an original image formed on a recording material based on a print job and generates a read image, and a hardware processor that analyzes the read image and performs an image inspection, wherein the hardware processor: acquires the read image from the image reader, detects an edge from the read image, and excludes a region near the edge from a target of the image inspection; performs a predetermined filter process on the read image after the exclusion process to generate a first reference image; compares the read image after the exclusion process with the first reference image to generate a first comparison image; and binarizes the first comparison image using a predetermined threshold to detect points where a specific abnormality has occurred, and outputs a detection result.

24 Claims, 11 Drawing Sheets

(52) U.S. Cl.
      CPC .............. *G06T 2207/10008* (2013.01); *G06T*
            *2207/30144* (2013.01); *G06T 2207/30168*
            (2013.01)

(56)                   References Cited

U.S. PATENT DOCUMENTS

|              |       |         |                              |
|--------------|-------|---------|------------------------------|
| 6,630,996    | B2 *  | 10/2003 | Rao .................... G01N 21/9501 356/237.4 |
| 7,076,086    | B2 *  | 7/2006  | Miyake .................. H04N 1/387 358/1.9 |
| 7,248,366    | B2 *  | 7/2007  | Uesugi .................. B21C 51/005 356/431 |
| 7,702,173    | B2    | 4/2010  | Gao et al.                   |
| 8,405,870    | B2 *  | 3/2013  | Uwatoko ............. H04N 1/4072 358/1.9 |
| 9,544,447    | B2    | 1/2017  | Shijoh                       |
| 9,709,907    | B2 *  | 7/2017  | Watariguchi ......... G03G 5/0637 |
| 11,159,688   | B2 *  | 10/2021 | Kurohata ........... H04N 1/00477 |
| 2002/0088952 | A1 *  | 7/2002  | Rao .................... G01N 21/9501 250/559.45 |
| 2002/0154308 | A1 *  | 10/2002 | Uesugi .................. B21C 51/005 356/431 |
| 2003/0076518 | A1 *  | 4/2003  | Miyake .................. H04N 1/387 358/1.9 |
| 2003/0092572 | A1 *  | 5/2003  | Hara ...................... B41M 5/423 503/226 |
| 2010/0123914 | A1 *  | 5/2010  | Uwatoko ............. H04N 1/4072 358/1.9 |
| 2011/0052078 | A1    | 3/2011  | Yamakawa                     |
| 2012/0121139 | A1    | 5/2012  | Kojima et al.                |
| 2013/0057886 | A1 *  | 3/2013  | Yasuda .................. G06T 7/001 358/1.13 |
| 2013/0136315 | A1    | 5/2013  | Kawamoto                     |
| 2013/0148863 | A1    | 6/2013  | Muraishi                     |
| 2013/0250319 | A1    | 9/2013  | Kaneko et al.                |
| 2015/0362848 | A1 *  | 12/2015 | Watariguchi ......... G03G 5/0629 430/77 |
| 2016/0258810 | A1 *  | 9/2016  | Van Der Post ..... G03F 7/70516 |
| 2016/0275664 | A1    | 9/2016  | Kitai et al.                 |
| 2017/0236036 | A1 *  | 8/2017  | Kawai .................. G06V 10/446 382/170 |
| 2018/0253850 | A1 *  | 9/2018  | Kawai ...................... G06T 7/11 |
| 2018/0268534 | A1    | 9/2018  | Kaneko                       |
| 2020/0025690 | A1    | 1/2020  | Koshihara et al.             |
| 2020/0104987 | A1 *  | 4/2020  | Nakano ............. H04N 1/00045 |
| 2020/0111199 | A1    | 4/2020  | Ikeda                        |
| 2020/0153999 | A1    | 5/2020  | Itou et al.                  |
| 2020/0322492 | A1 *  | 10/2020 | Kurohata ........... H04N 1/00076 |
| 2022/0189003 | A1 *  | 6/2022  | Ishii .................... H04N 1/6033 |
| 2023/0065425 | A1 *  | 3/2023  | Daiku ............... H04N 1/00005 |

FOREIGN PATENT DOCUMENTS

| JP | 2011-047862 A | 3/2011  |
|----|---------------|---------|
| JP | 2016046595 A  | 4/2016  |
| JP | 2017-053673 A | 3/2017  |
| JP | 2017-202627 A | 11/2017 |

OTHER PUBLICATIONS

Office Action (Notice of Reasons for Refusal) issued on Dec. 10, 2024, by the Japanese Patent Office in corresponding Japanese Patent Application No. 2024-036832, and an English Translation of the Office Action. (8 pages).

First Office Action issued on Mar. 21, 2025, by the Chinese Patent Office in corresponding Chinese Patent Application No. 202210944870.9, and an English Translation of the Office Action. (20 pages).

Second Office Action issued on Jul. 19, 2025, by the Chinese Patent Office in corresponding Chinese Patent Application No. 202210944870.9, and an English Translation of the Office Action. (26 pages).

\* cited by examiner

*FIG. 6*

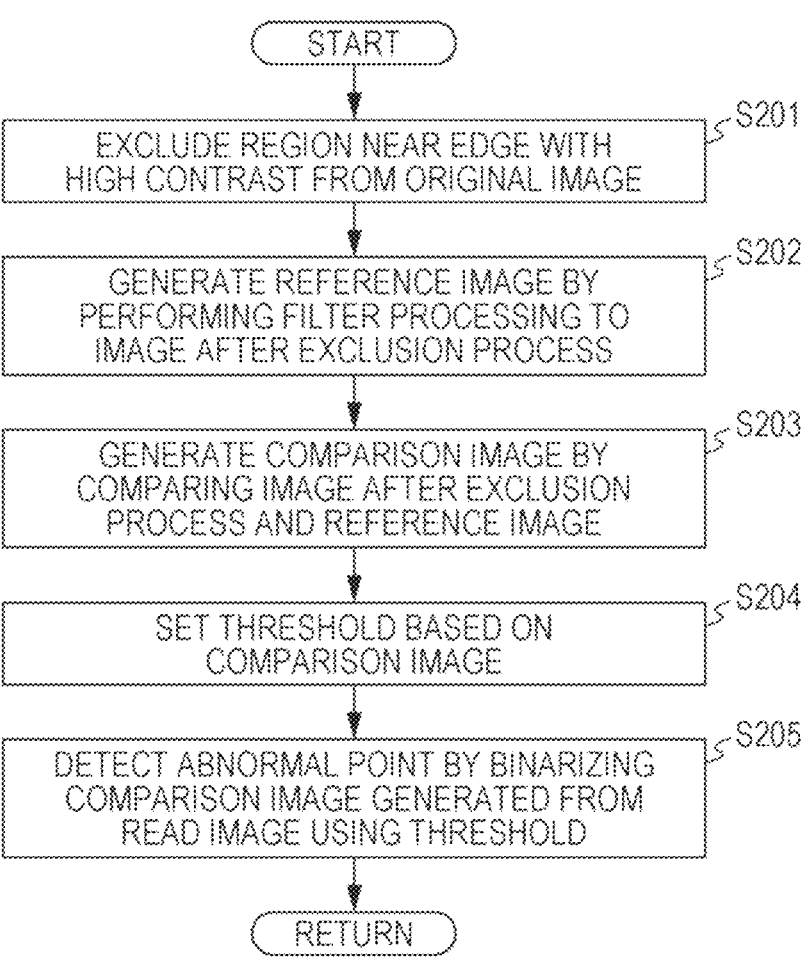

START

S201
EXCLUDE REGION NEAR EDGE WITH
HIGH CONTRAST FROM ORIGINAL IMAGE

S202
GENERATE REFERENCE IMAGE BY
PERFORMING FILTER PROCESSING TO
IMAGE AFTER EXCLUSION PROCESS

S203
GENERATE COMPARISON IMAGE BY
COMPARING IMAGE AFTER EXCLUSION
PROCESS AND REFERENCE IMAGE

S204
SET THRESHOLD BASED ON
COMPARISON IMAGE

S205
DETECT ABNORMAL POINT BY BINARIZING
COMPARISON IMAGE GENERATED FROM
READ IMAGE USING THRESHOLD

RETURN

FIG. 9

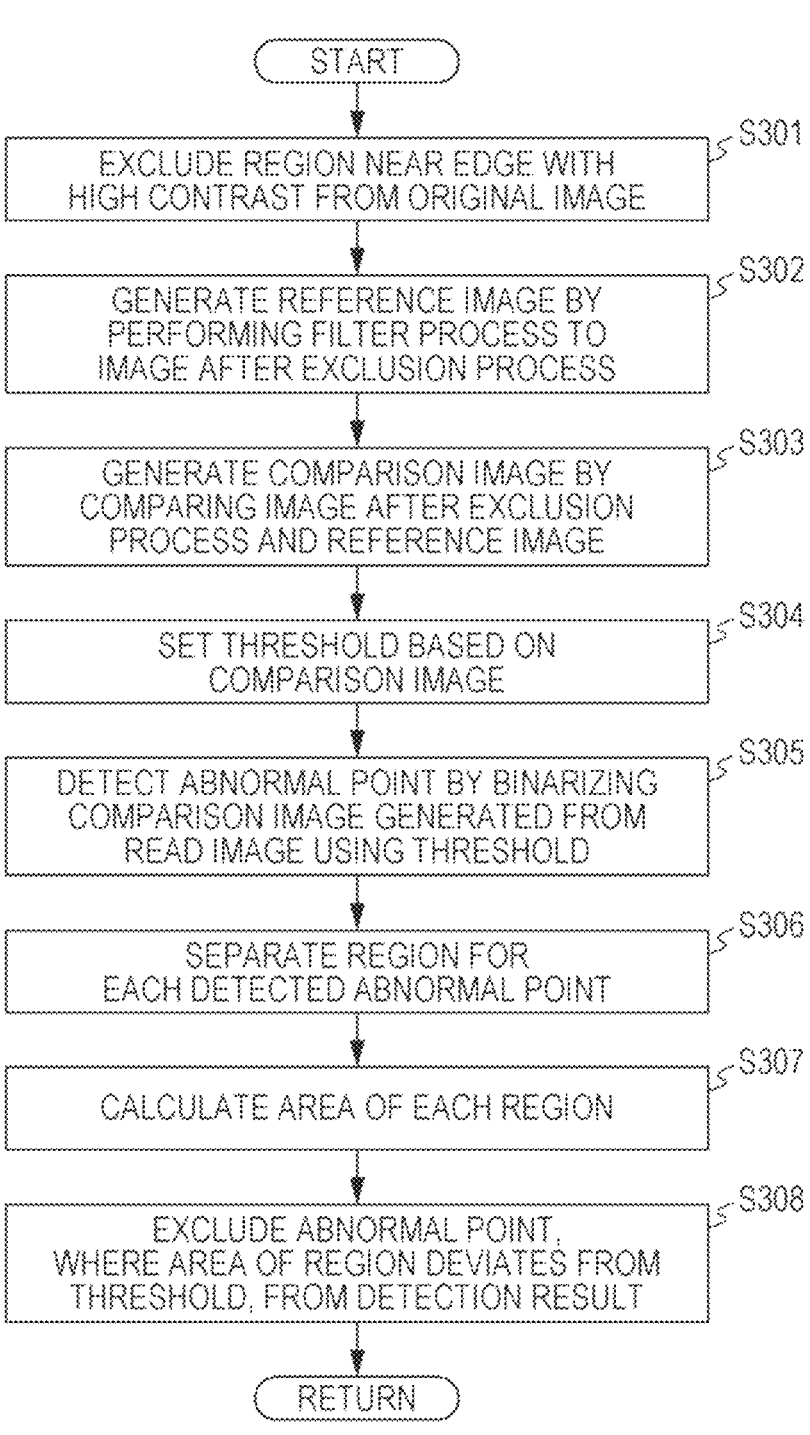

START

S301
EXCLUDE REGION NEAR EDGE WITH
HIGH CONTRAST FROM ORIGINAL IMAGE

S302
GENERATE REFERENCE IMAGE BY
PERFORMING FILTER PROCESS TO
IMAGE AFTER EXCLUSION PROCESS

S303
GENERATE COMPARISON IMAGE BY
COMPARING IMAGE AFTER EXCLUSION
PROCESS AND REFERENCE IMAGE

S304
SET THRESHOLD BASED ON
COMPARISON IMAGE

S305
DETECT ABNORMAL POINT BY BINARIZING
COMPARISON IMAGE GENERATED FROM
READ IMAGE USING THRESHOLD

S306
SEPARATE REGION FOR
EACH DETECTED ABNORMAL POINT

S307
CALCULATE AREA OF EACH REGION

S308
EXCLUDE ABNORMAL POINT,
WHERE AREA OF REGION DEVIATES FROM
THRESHOLD, FROM DETECTION RESULT

RETURN

IMAGE INSPECTION APPARATUS, IMAGE INSPECTION METHOD, AND IMAGE INSPECTION PROGRAM

The present application is a coninuation application of U.S. patent application Ser. No. 16/546,721, filed on Aug. 21, 2019, which claims the priority of Japanese Patent Application No. 20018-189915, filed on Oct. 5, 2018. The entire contents of U.S. patent application Ser. No. 16/546, 721 and Japanese Patent Application No. 2018-189915, are incorporated herein by reference in their entirety.

BACKGROUND

Technological Field

The present invention relates to an image inspection apparatus, an image inspection method, and an image inspection program, and more particularly to an image inspection apparatus, an image inspection method, and an image inspection program that inspect a read image.

Description of the Related Art

In an electrophotographic printed matter, an abnormality which is not present in an image to be printed may occur. For example, in electrophotography, a spot-like abnormality caused by a so-called firefly phenomenon may occur at the time of transfer, and this spot-like abnormality appears as light ups and downs on a halftone image. The abnormality caused by the firefly phenomenon occurs when a developer is compressed and solidified in a space of a container when the developer is charged with a high packing density, and a clump of this developer adheres to a sheet of paper.

There are many known methods for optically inspecting such abnormalities, not limited to the field of printing. For example, JP 2001-209798 A discloses a method of optically inspecting a defect of an object having a repetitive pattern region as an appearance inspection method of a semiconductor wafer, that performs a process of generating a reference image by removing a change in gradation due to a defect from a captured image of the repetitive pattern region, a process of obtaining an image in which only a steep gradation change amount is extracted by comparing and calculating a reference image and the captured image, and a process of determining the presence or absence of a defective portion by binarizing the lightness value of the extracted image.

According to the method disclosed in JP 2001-209798 A, it can be said that the reference image is generated by performing a smoothing process to remove the frequency component of the defective portion to be detected from the captured image. However, in the case of a printed matter, an image to be printed includes various forms of content, and, for example, in the case where the image to be printed has content having a frequency component equivalent to that of the abnormality to be detected, if a defective portion is detected using the method disclosed in JP 2001-209798 A, the content in which no abnormality has occurred will be erroneously detected.

SUMMARY

The present invention has been made in view of the above problems, and its main object is to provide an image inspection apparatus, an image inspection method, and an image inspection program capable of appropriately detecting a specific abnormality from a read image.

To achieve the abovementioned object, according to an aspect of the present invention, an image inspection apparatus reflecting one aspect of the present invention comprises an image reader that reads an original image formed on a recording material based on a print job and generates a read image, and a hardware processor that analyzes the read image and performs an image inspection, wherein the hardware processor: acquires the read image from the image reader, detects an edge from the read image, and excludes a region near the edge from a target of the image inspection; performs a predetermined filter process on the read image after the exclusion process to generate a first reference image; compares the read image after the exclusion process with the first reference image to generate a first comparison image; and binarizes the first comparison image using a predetermined threshold to detect points where a specific abnormality has occurred, and outputs a detection result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a flowchart indicating an operation (abnormal point detection process) of the image inspection apparatus according to the first example of the present invention;

FIG. 9 is a flowchart indicating an operation (abnormal point detection process) of an image inspection apparatus according to a second example of the present invention;

DETAILED DESCRIPTION OF EMBODIMENTS

Hereinafter, one or more embodiments of the present invention will be described with reference to the drawings. However, the scope of the invention is not limited to the disclosed embodiments.

As illustrated in the description of the related art, in electrophotography, a spot-like abnormality caused by a firefly phenomenon may occur at the time of transfer, and this spot-like abnormality appears as light ups and downs on a halftone image. As a method of optically inspecting such an image abnormality, JP 2001-209798 A describes a method of generating a reference image by smoothing a captured image as a method of inspecting the appearance of a semiconductor wafer. However, in the case of printed matter, an image to be printed contains various forms of content, and when the image to be printed has content with the same frequency component as that of the abnormality to be detected, content in which no abnormality has occurred may be erroneously detected.

Therefore, according to one embodiment of the present invention, in order to appropriately detect a specific abnormality such as an abnormality caused by a firefly phenomenon without erroneously detecting content included in an image to be printed (referred to as an original image), an edge having a relatively high contrast is detected from the read image, regions near the edge is excluded from an image inspection target, a predetermined filter process is performed on the read image after the exclusion process to generate a first reference image, the read image after the exclusion process with the first reference image to generate a first comparison image, the first comparison image is binarized using a predetermined threshold to detect points where a specific abnormality has occurred.

Figure 1:
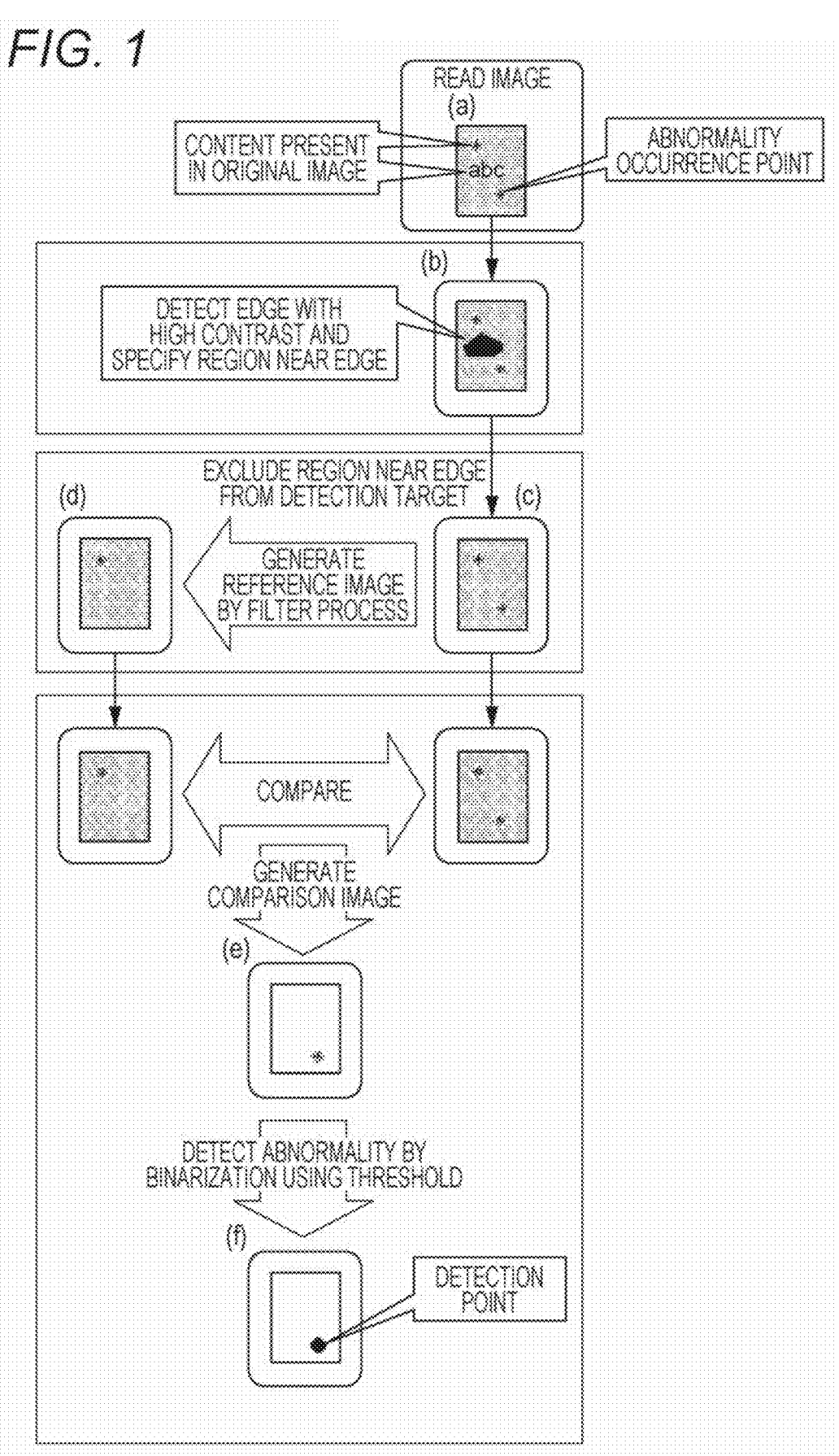
FIG. 1 is a schematic diagram illustrating an image inspection method according to an embodiment of the present invention.

Specifically, as illustrated in FIG. 1, when the read image includes the content present in the original image and the abnormality occurrence points (refer to FIG. 1(a)), a known method (for example, a method that defines the position where the absolute value of the first derivative of concentration change is maximum or the position where the second derivative of a concentration change crosses zero as an edge) is used to detect an edge having a relatively high contrast, and identifies a region near the edge (refer to FIG. 1(b)). Next, an image excluding a specific edge vicinity region from the detection target is generated (refer to FIG. 1(c)), and a predetermined filter process (for example, blurring process) is performed on the image to generate a reference image (refer to FIG. 1(d)). Next, a comparison image is generated by comparing (extracting a difference) the image excluding the edge vicinity region with the reference image (refer to FIG. 1(e)), and binarizing the comparison image using a predetermined threshold to detect abnormal point (see FIG. 1(f)). For example, binarization is performed using a threshold obtained from a comparison image generated by performing the same process on the original image, and an abnormal point is detected. Further the abnormal point detected by binarizing with the threshold is narrowed down using a threshold of an area or a threshold of circularity, which is determined according to a specific abnormality.

As described above, by excluding the region near the edge having a relatively high contrast from the detection target of the abnormal point, it is possible to prevent erroneous detection of the content such as text or graphics included in the original image. In addition, by performing blurring processing as filter processing, it is possible to include an abnormality caused by the firefly phenomenon in the comparison image and to reliably detect a specific abnormality.

Further, by using the threshold obtained from the comparison image generated from the original image as a threshold, erroneous detection of the content included in the original image can be prevented, and by using the area threshold value or the circularity threshold value as a threshold value, a specific abnormality can be detected with certainty.

First Example

Figures 2, 3:
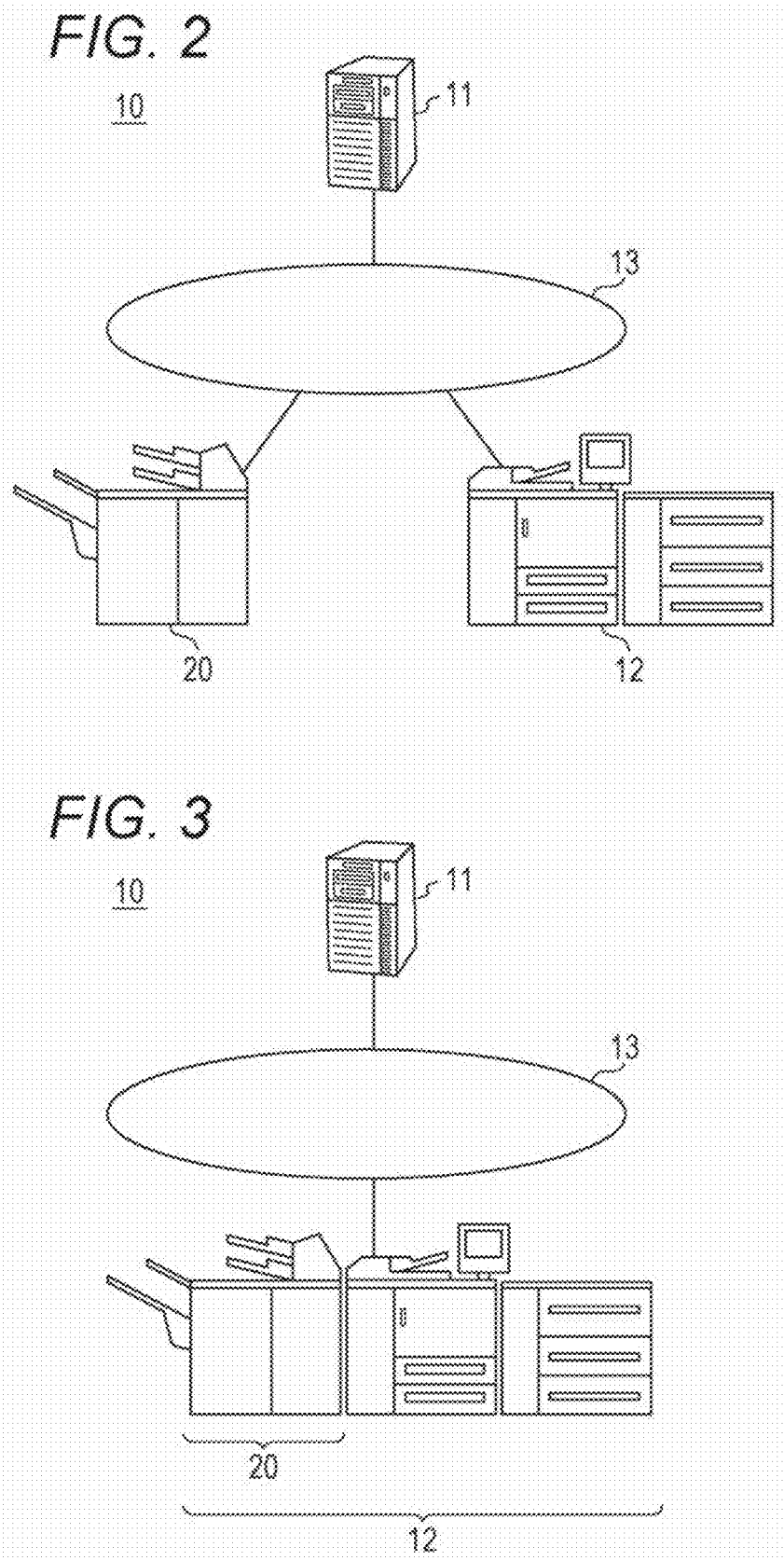
FIG. 2 is a schematic diagram indicating a configuration example of an image inspection system according to a first example of the present invention.
FIG. 3 is a schematic diagram indicating another configuration example of the image inspection system according to the first example of the present invention.
Figures 4A, 4B:
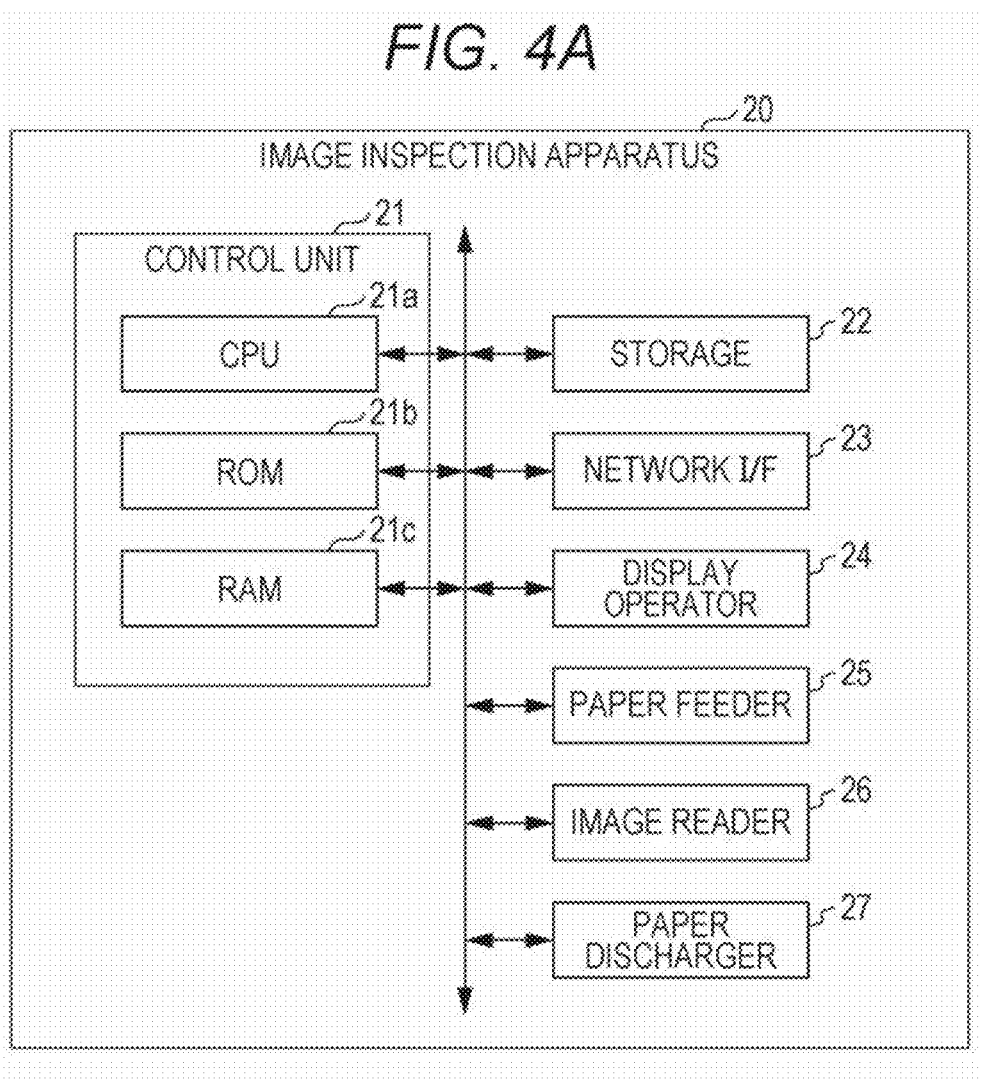
FIGS. 4A and 4B are block diagrams indicating a configuration of the image inspection apparatus according to the first example of the present invention.
Figure 5:
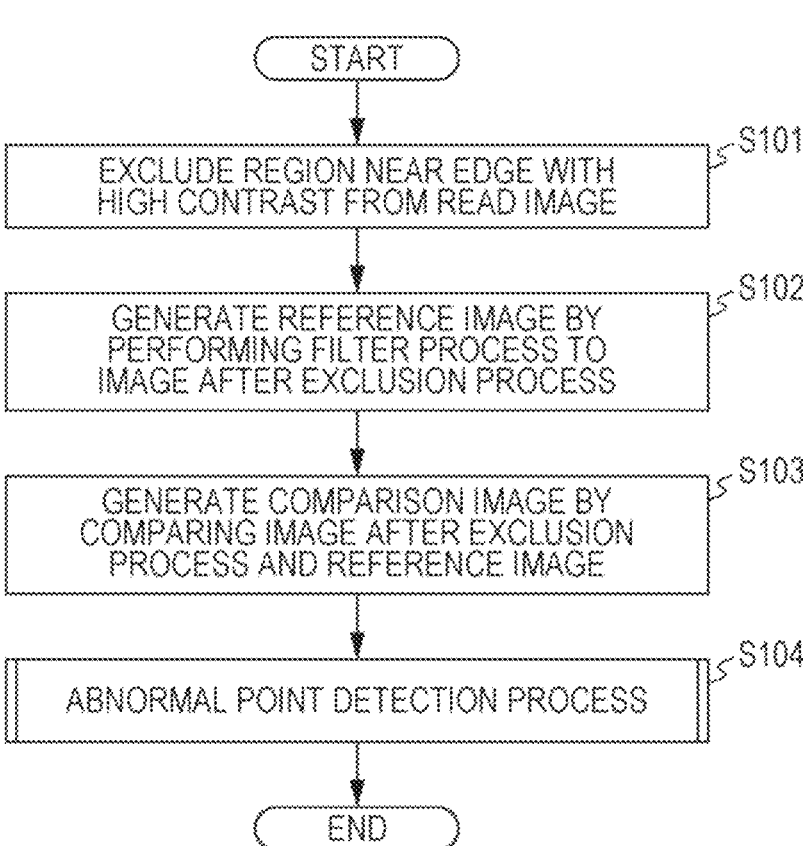
FIG. 5 is a flowchart indicating an operation of the image inspection apparatus according to the first example of the present invention.
Figure 7:
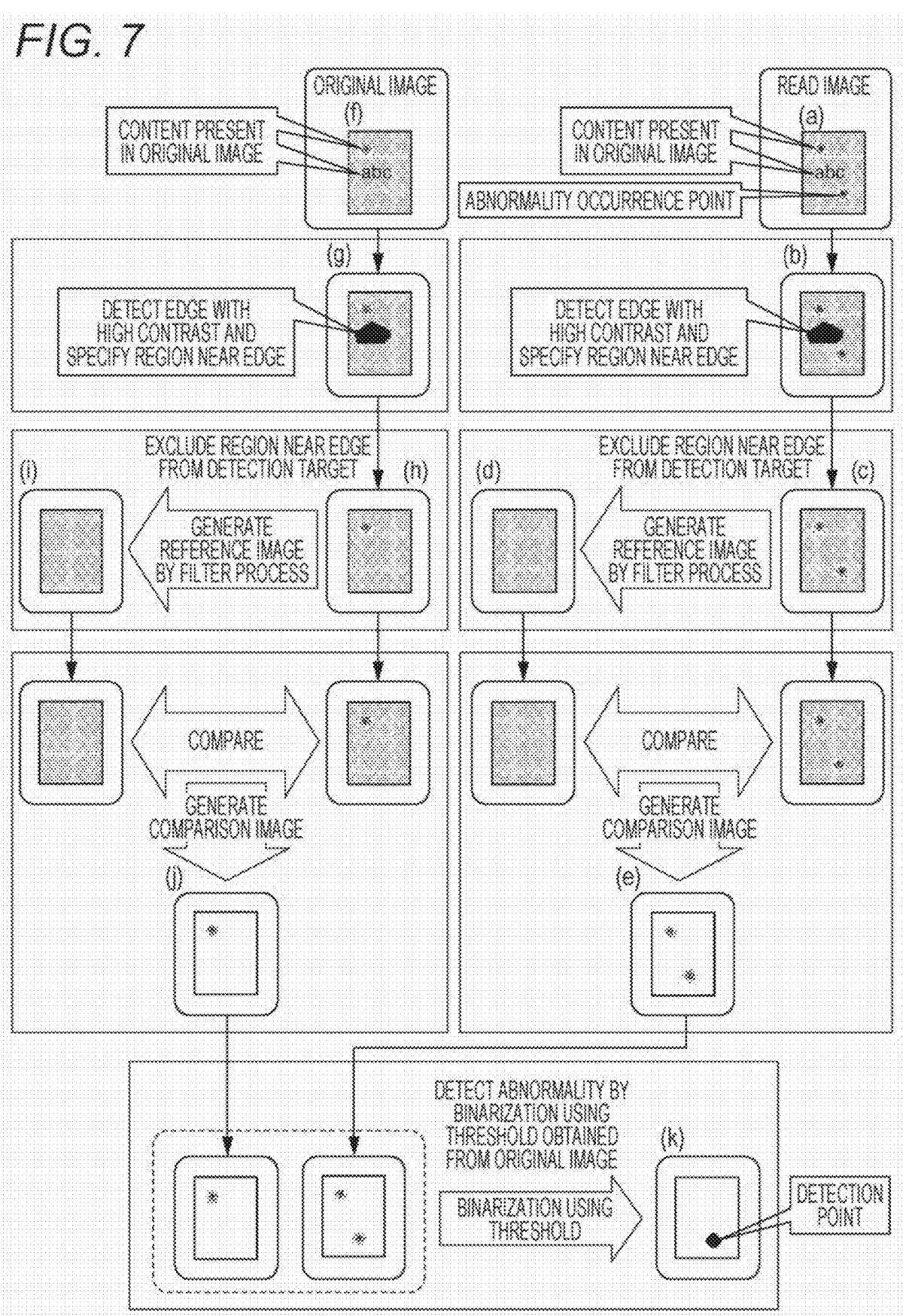
FIG. 7 is a schematic diagram illustrating an image inspection method according to the first example of the present invention.
Figure 8:
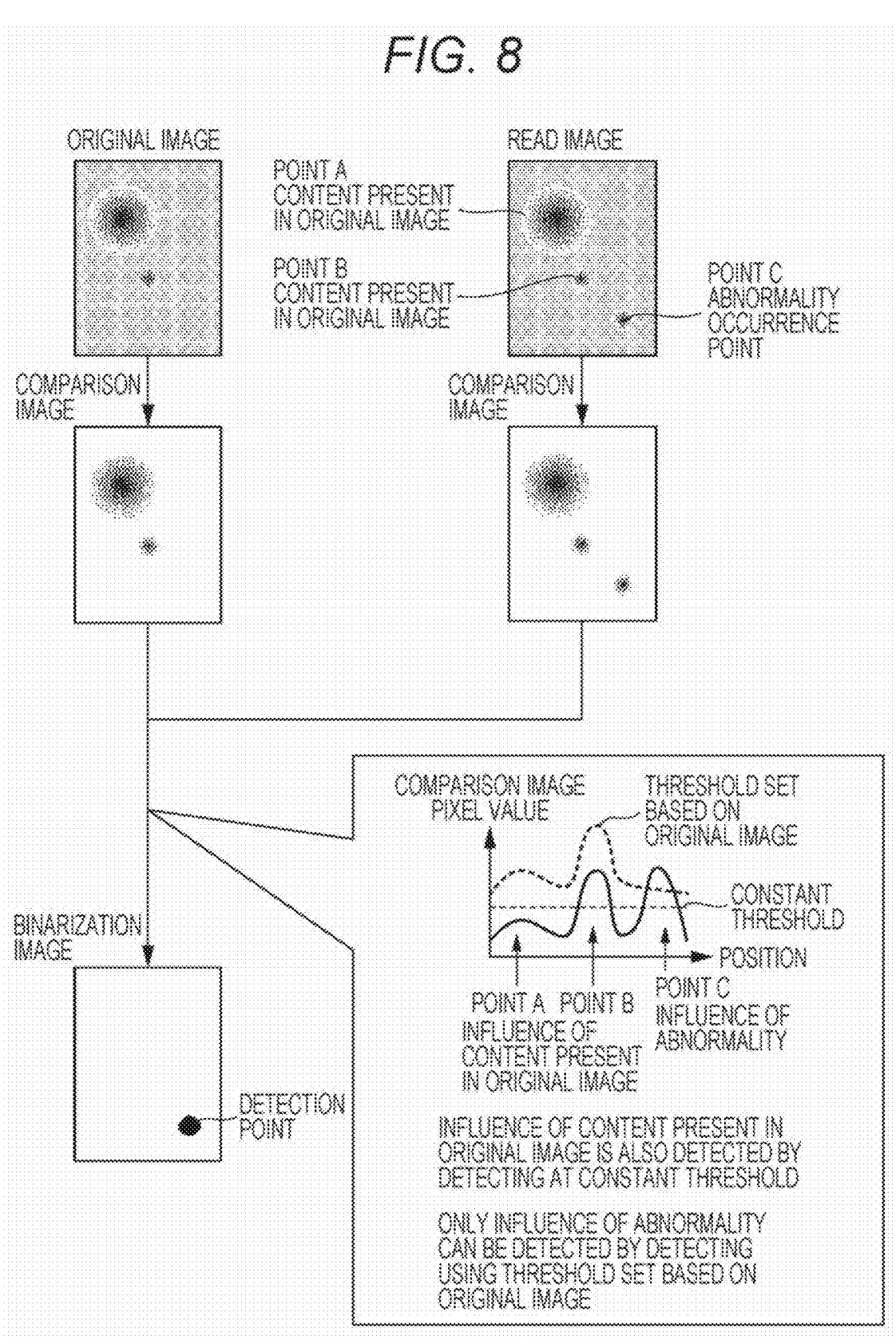
FIG. 8 is a schematic diagram illustrating the effect of a threshold in the image inspection method according to the first example of the present invention.

To describe the above-described embodiment of the present invention in further detail, an image inspection apparatus, an image inspection method, and an image inspection program according to a first example of the present invention will be described with reference to FIGS. 2 to 8. FIGS. 2 and 3 are schematic views indicating a configuration example of an image inspection system of the present example, and FIGS. 4A and 4B are block diagrams indicating the configuration of the image inspection apparatus of the present example. FIGS. 5 and 6 are flowcharts indicating the operation of the image inspection apparatus of the present example. FIG. 7 is a schematic diagram illustrating the image inspection method of the present example. FIG. 8 is a schematic diagram illustrating the effect of a threshold in the image inspection method according to the present example.

As illustrated in FIG. 2, an image inspection system 10 according to the present example performs raster image processing (RIP) on a print job input from a computer device or the like (not illustrated) and includes a controller 11 provided with a RIP unit for outputting image data subjected to RIP (referred to as original image data), an image forming apparatus 12 provided with a printer that forms an image (original image) on a recording material (paper) based on original image data, and an image inspection apparatus 20 which reads an original image formed on the recording material and inspects the finish of a printed matter. These are connected so as to communicate data via a communication network 13 such as local area network (LAN) or a wide area network (WAN) defined by standards such as Ethernet (registered trademark), Token Ring, and Fiber-Distributed Data Interface (FDDI).

The RIP unit of the controller 11 translates a print job described in a page description language (PDL) such as a printer control language (PCL) or a post script (PS) to generate intermediate data, performs color conversion on the intermediate data using a conversion table, performs rendering, and generates image data of each page.

Further, the printer of the image forming apparatus 12 is composed of components necessary for image formation using an imaging process such as an electrophotographic method, and prints an image based on image data on a specified sheet. Specifically, light corresponding to an image is irradiated from an exposure device to the photosensitive drum charged by a charging device to form an electrostatic latent image, a charged toner which is charged by the charging device is attached to a developing device and developed, a toner image is primarily transferred to a transfer belt, secondary transferred from the transfer belt to a sheet of paper, further, the fixing device performs processing for fixing the toner image on the sheet.

Although the image inspection system 10 is formed by the controller 11, the image forming apparatus 12, and the image inspection apparatus 20 in FIG. 2, when the image forming apparatus 12 has a function as the image inspection apparatus 20, as illustrated in FIG. 3 the image inspection system 10 can also be formed by the controller 11 and the image forming apparatus 12. When the image forming apparatus 12 is provided with a function as the controller 11 (the image forming apparatus 12 is provided with the RIP unit), the image inspection system 10 can include the image forming apparatus 12 and the image inspection apparatus 20 (or only the image inspection apparatus 20). Hereinafter, the image inspection apparatus 20 will be described on the premise of the configuration of FIG. 2.

As indicated in FIG. 4A, the image inspection apparatus 20 in the configuration of FIG. 2 includes a control unit 21, a storage 22, a network I/F 23, a display operator 24, a paper feeder 25, an image reader 26, paper discharger 27, and the like.

The control unit 21 includes a central processing unit (CPU) 21a and memories such as a read only memory (ROM) 21b and a random access memory (RAM) 21c, which are connected via a bus. The CPU 21a reads a program from the ROM 21b or the storage 22, develops the program in the RAM 21c, and executes the program to control the entire image inspection apparatus 20.

The storage 22 includes a hard disk drive (HDD), a solid state drive (SSD), or the like, and stores a program for the CPU 21a to control each unit, original image data, and a read image data obtained by reading an original image formed on a sheet, a threshold calculated based on the original image.

The network I/F 23 includes a network interface card (NIC), a modem, or the like and connects the image inspection apparatus 20 to the communication network 13 to enable reception of original image data from the controller 11.

The display operator 24 is formed of a touch panel or the like in which an operator such as a touch sensor in which electrodes are arranged in a grid shape is formed on a display such as a liquid crystal display (LCD) or an organic electro luminescence (EL) display. The display operator 24 displays various screens related to the operation of the image inspection apparatus 20 and receives various operations related to the operation of the image inspection apparatus 20. A hard key or the like may be provided as the operator, or the display and the operator may be separated.

The paper feeder 25 includes one or a plurality of paper feed trays, and conveys a sheet on which an image (original image) is formed by the image forming apparatus 12 to the image reader 26.

The image reader 26 reads an image (original image) formed on a sheet, optically scans a sheet on which an image is formed, for example, and reads the image by condensing reflected light from a sheet of paper on a light receiving surface of a sensor such as a charge coupled device (CCD).

The paper discharger 27 includes one or a plurality of paper discharge trays, and discharges a sheet after image reading. In the present example, it is preferable that the paper discharger 27 has a plurality of discharge trays such that sheets on which a specific abnormality (in the present example, an abnormality caused by a firefly phenomenon) has been detected by an abnormal point detection unit 31 described later can be discharged by being separated from normal sheets.

Further, as illustrated in FIG. 4B, the control unit 21 also functions as an exclusion process unit 28, a filter process unit 29, a comparison process unit 30, an abnormal point detection unit 31, and the like.

The exclusion process unit 28 acquires a read image from the image reader 26, detects an edge having a relatively high contrast from the read image, and excludes a region near the edge (a region surrounding a series of edges) from an image inspection (detection of abnormal points) target such that content such as text and graphics included in the original image is not erroneously detected as an abnormal portion. Further, the exclusion process unit 28 acquires an original image from the controller 11, the image forming apparatus 12, etc., detects an edge having a relatively high contrast from the original image, and excludes a region near the edge from a detection target of an abnormal point. In addition, when the original image includes content having a frequency component equivalent to that of a specific abnormality (for example, an abnormality caused by a firefly phenomenon) in the original image, if necessary, the exclusion process unit 28 excludes the content from the abnormality detection target. Note that exclusion includes both of the case of deleting an area near the edge or content from the read image or original image (in a case where the background is a uniform image, the region near the edge or the content is overwritten with the background image) and the case of setting so as not to detect abnormal points in the region near the edge or the content without deleting the region near the edge or the content from the read image or the original image (or overwriting with the background image).

The filter process unit 29 performs filter processing (blurring process, for example, a process of averaging the pixel values of focused pixel using the pixel values of the pixels around it) for filtering a specific abnormality (for example, an abnormality caused by a firefly phenomenon) on the read image after the exclusion process by the exclusion process unit 28 to generate a reference image (first reference image). Further, the filter process unit 29 performs the same filter processing as that of the read image on the original image after the exclusion process by the exclusion process unit 28 to generate a reference image (second reference image).

The comparison process unit 30 compares the read image after the exclusion process by the exclusion process unit 28 with the reference image (first reference image) to extract a difference and generates a comparison image (first comparison image) composed of the difference. In addition, the comparison process unit 30 compares the original image after the exclusion process by the exclusion process unit 28 with the reference image (second reference image) to extract a difference and generates a comparison image (second comparison image) composed of the difference.

The abnormal point detection unit 31 binarizes the first comparison image using a predetermined threshold to detect points where a specific abnormality (for example, an abnormality caused by a firefly phenomenon) have occurred, and outputs a detection result. In the present example, in particular, a threshold is calculated based on the second comparison image (comparison image generated from the original image), and the first comparison image is binarized using the threshold to detect the points where the specific abnormality has occurred, and outputs the detection result. For example, the detection result is displayed on the display operator 24, and the sheet in which a specific abnormality is detected is output to a sheet discharge tray different from a sheet discharge tray for discharging normal sheets.

The exclusion process unit 28, the filter process unit 29, the comparison process unit 30, and the abnormal point detection unit 31 may be formed as hardware or may be formed as an image inspection program that causes the control unit 21 to function as the exclusion process unit 28, the filter process unit 29, the comparison process unit 30, and the abnormal point detection unit 31 such that the CPU 21a can execute the image inspection program.

Note that, FIGS. 4A and 4B indicate examples of the image inspection apparatus 20 of the present example, and the configuration can be changed as appropriate. For example, in the case of the image inspection system 10 having the configuration illustrated in FIG. 3, an image formed on a sheet can be read using the in-line sensor of the image forming apparatus 12. In that case, the paper feeder 25 and the image reader 26, and the paper discharger 27 can be omitted.

Hereinafter, the specific operation of the image inspection apparatus 20 of the present example will be described with reference to FIGS. 5 to 8. The CPU 21*a* executes the processing of each step indicated in the flowcharts of FIGS. 5 and 6 by developing the image inspection program stored in the ROM 21*b* or the storage 22 on the RAM 21*c* and executing the program. Note that, in the following description, as illustrated in FIG. 7, it is assumed that the original image is a uniform halftone image (represented by hatching of dots in the drawing), and one spot-like content and one text content are included therein (refer to FIG. 7(*f*)), and a spot-like abnormality occurs at one point in the read image obtained by reading the original image (refer to FIG. 7(*a*)).

The control unit 21 (exclusion process unit 28) acquires a read image from the image reader 26, detects an edge having a relatively high contrast from the read image, identifies a region near the edge, such that the region near the edge is excluded from the detection target of the abnormal portion (S101). For example, as illustrated in FIG. 7(*b*), a text area is identified by detecting characters printed in a color (for example, black) having a high contrast relative to the ground color, and as shown in FIG. 7(*c*), the specified area is deleted from the read image. In the vicinity of the edge, since the gradation change is sharp, there is a possibility of erroneous detection when detecting abnormal points. Therefore, erroneous detection can be prevented by detecting the edge portion and excluding the vicinity of the edge portion from the abnormal point detection target. To detect this edge portion, it is generally known to use a differential filter represented by a Sobel filter, and the position at which the absolute value of the first derivative of the concentration change is maximum, or the position at which the second derivative of the concentration change crosses zero can be detected as an edge.

Next, the control unit 21 (filter process unit 29) performs a predetermined filter process on the read image after the exclusion process to generate a reference image (S102, refer to FIG. 7(*d*)). This filter is a filter for the purpose of removing the frequency of the abnormality to be detected, and the filter strength and size depend on the abnormality to be detected. For example, since a firefly phenomenon often occurs as a phenomenon having a diameter of about 1 to 3 mm, setting the filter size to, for example, about 5 mm can generate a reference image from which the influence of the firefly phenomenon has been removed.

Next, the control unit 21 (comparison process unit 30) generates a comparison image by comparing the read image with the reference image (S103, refer to FIG. 7(*e*)). For example, a comparison image is generated by calculating the difference between pixel values at corresponding positions of two images. When this difference is calculated, a difference value is generated only at a point where there is a difference between the two images, that is, a point where the spot-like abnormality has originally occurred.

Next, the control unit 21 (abnormal point detection unit 31) processes (binarizes) the comparison image using a predetermined threshold, detects an abnormal point, and outputs a detection result (S104, refer to FIG. 7(*k*)). In the comparative image, since the difference value is generated at the point where the spot-like abnormality has occurred, this process can detect the point where the abnormality has occurred.

Here, the original image often includes not only halftone but also some content. For example, if the original image has content with the same frequency component as that of the abnormality to be detected, if the abnormal point is detected using only the read image, the point of the content not having an abnormality may be erroneously detected.

Therefore, in the present example, in the point where the content exists in the original image, a threshold for detecting an abnormal point is increased to lower detection sensitivity so as not to erroneously detect the location of the content. Specifically, the same process as that for the read image is performed on the original image, a comparison image is generated from the original image, and a threshold is set using the comparison image. FIG. 6 indicates a specific example of the abnormal point detection process of S104 of FIG. 5.

First, the control unit 21 (exclusion process unit 28) acquires an original image from the controller 11, the image forming apparatus 12, and the like, detects an edge having a high contrast from the original image, specifies a region near the edge, and excludes the region near the specified edge from the detection target of the abnormal portion (S201, see FIGS. 7(*f*) to (*h*)). Next, the control unit 21 (filter process unit 29) performs the above-described predetermined filter process on the original image after the exclusion process to generate a reference image (refer to S202 and FIG. 7(*i*)). Next, the control unit 21 (comparison process unit 30) compares the original image with the reference image to generate a comparison image (S203, refer to FIG. 7(*j*)). In this image, the difference value occurs only in the portion of the content present in the original image and having the same frequency component as the spot abnormality.

Next, the control unit 21 (abnormal point detection unit 31) sets a threshold for each position using a comparison image obtained from the original image (S204), detects an abnormal point by processing (binarizing) a comparison image generated from a read image by using the set threshold, and output a detection result (S205, refer to FIG. 7(*k*)).

The effect of the threshold set based on the comparison image obtained from the original image is indicated in FIG. 8. The points A and B in FIG. 8 are points where there is content present in the original image, and the point C is a point where an abnormality has occurred. At this time, when the entire image is binarized using a certain threshold, the pixel values of the points B and C exceed the threshold, and therefore the point B is detected in addition to the point C. Therefore, the threshold is changed for each position according to the comparison image of the original image. That is, since the difference value occurs even in the comparison image obtained from the original image in the points A and B, the detection sensitivity can be lowered by increasing the threshold. On the other hand, since the difference value does not occur in the comparison image obtained from the original image in the point C, the threshold does not increase, and an abnormal point can be detected.

As described above, by excluding the region near the edge having a relatively high contrast from the detection target of the abnormal point, it is possible to prevent erroneous detection of the content such as text or graphics included in the original image. In addition, by performing blurring processing as filter processing, it is possible to include an abnormality caused by the firefly phenomenon in the comparison image and to reliably detect a specific abnormality. In addition, by using a threshold obtained from a comparison image generated from an original image as a threshold value, it is possible to prevent erroneous detection of content included in the original image.

Second Example

Figure 10:
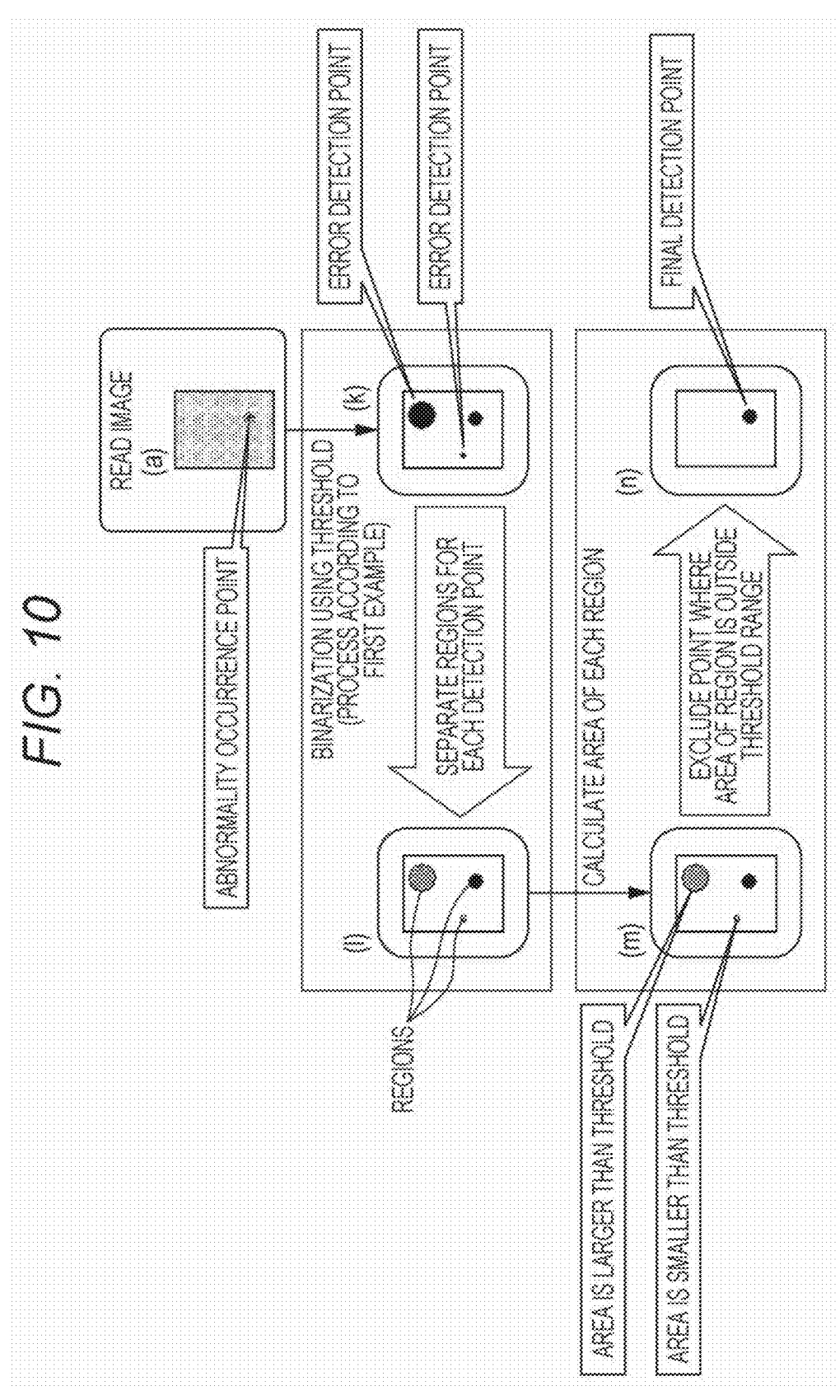
FIG. 10 is a schematic diagram illustrating an image inspection method according to the second example of the present invention.

Next, an image inspection apparatus, an image inspection method, and an image inspection program according to a second example of the present invention will be described with reference to FIGS. 9 and 10. FIG. 9 is a flowchart indicating the operation (abnormal point detection process) of the image inspection apparatus of the present example, and FIG. 10 is a schematic diagram illustrating the image inspection method of the present example.

In the first example described above, as the abnormal point detection process, a threshold is set using the comparative image generated from the original image, and the abnormal point is detected by processing the comparative image generated from the read image with the threshold. However, even if an abnormality is detected using this threshold, erroneous detection may occur. This is caused by noise having a minute peak which cannot actually be visually recognized, a significant unevenness which is not a detection target, and the like.

To avoid such erroneous detection, in the present example, the detection points are narrowed based on the degree of the area. In that case, the configuration of an image inspection apparatus 20 is the same as that of the first example described above, but a control unit 21 (abnormal point detector 31) separates the region for each detected abnormal portion and calculates the area of each region, and an abnormal portion where the area of the calculated region deviates from a threshold set according to a specific abnormality (for example, an abnormality based on a firefly phenomenon) is excluded from the detection result to narrow down the abnormal point.

Hereinafter, the specific operation of the image inspection apparatus 20 of the present example will be described with reference to FIGS. 9 and 10. A CPU 21a executes processing of each step indicated in the flowchart of FIG. 9 by developing the image inspection program stored in a ROM 21b or a storage 22 on a RAM 21c and executing the program. FIG. 9 shows a specific example of the abnormal point detection process of S104 of FIG. 5 of the first example.

First, as in the first example, the control unit 21 (exclusion process unit 28) detects an edge having a relatively high contrast from an original image, and identifies a region near the edge, and excludes the region near the edge from an abnormal portion detection target (S301). Next, the control unit 21 (filter process unit 29) performs a predetermined filter process on the original image after the exclusion process to generate a reference image (S302). Next, the control unit 21 (comparison process unit 30) compares the original image with the reference image to generate a comparison image (S303). Next, the control unit 21 (abnormal point detection unit 31) sets a threshold for each position using the comparison image obtained from the original image (S304), and detects an abnormal point by processing (binarizing) the comparison image generated from a read image by using the set threshold (S305, refer to FIG. 10(k)).

Next, the control unit 21 (abnormal point detection unit 31) separates the region for each detected point (S306, refer to FIG. 10(l)), and calculates the area of each region (S307, refer to FIG. 10(m)), excludes, from the detection result, the abnormal portion where the area of the calculated region deviates from the threshold set according to the specific abnormality (for example, the abnormality caused by the firefly phenomenon), and narrows down the abnormal portion (S308, refer to FIG. 10(n)).

For example, in the case where the abnormality to be detected is a spot-like abnormality caused by a firefly phenomenon, it often occurs as an abnormality having a diameter of about 1 to 3 mm because the cause is a foreign substance serving as a nucleus. Therefore, by setting an area corresponding to a diameter of 1 to 3 mm as a threshold and excluding a region where the area deviates from the threshold, it is possible to prevent erroneous detection of an abnormality other than an abnormality caused by a firefly phenomenon.

Note that, the configuration in which, after detecting the abnormal portion using a threshold set based on the comparison image obtained from the original image, the abnormal portion is narrowed down using the area threshold is adopted here, but when there is no content having the frequency component equivalent to that of the abnormality to be detected in the original image, after detecting an abnormal portion using a predetermined threshold (for example, a fixed threshold), the abnormal portion may be narrowed down using the area threshold.

As described above, it is possible to reliably detect a specific abnormality by narrowing down the abnormal portion using the threshold (the area threshold) set according to the abnormality to be detected.

Third Example

Figure 11:
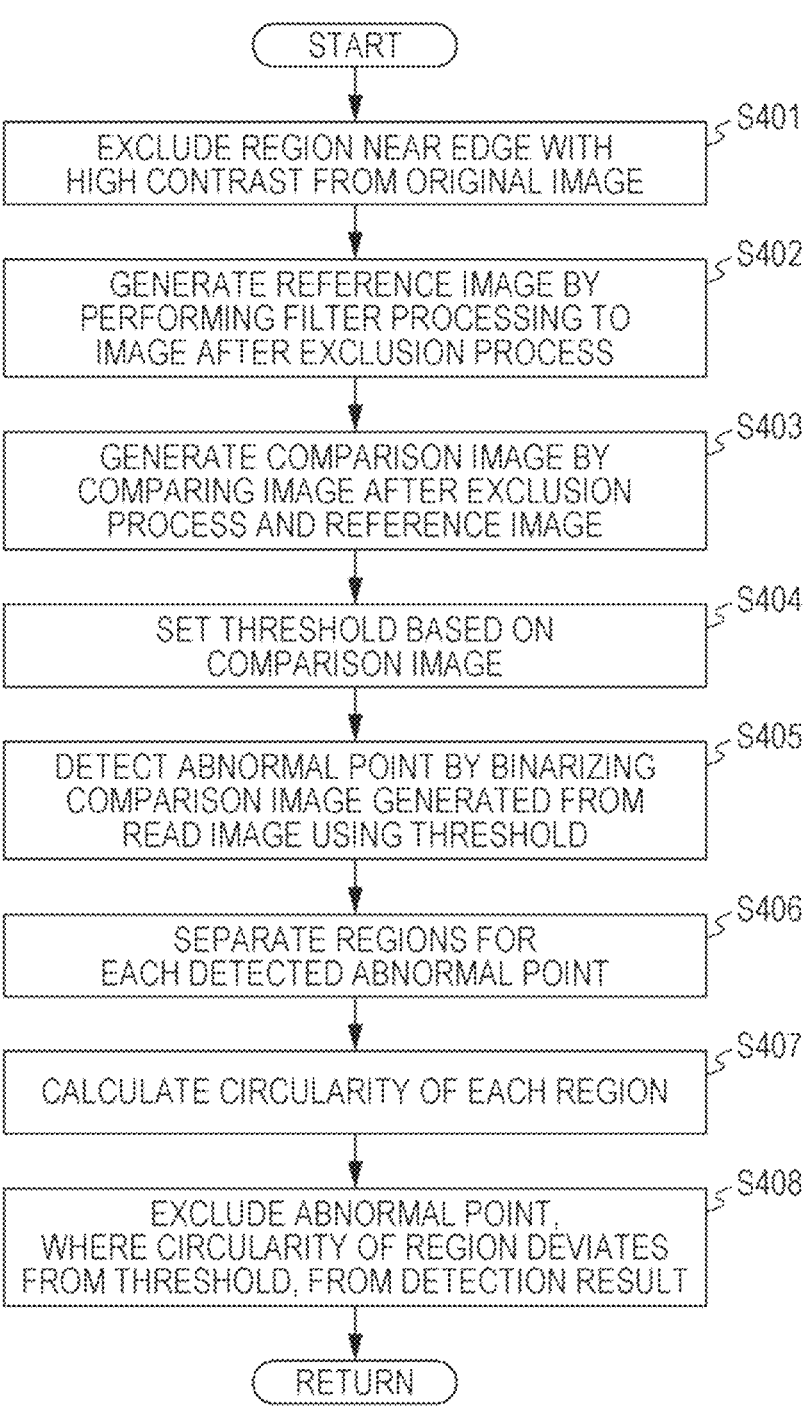
FIG. 11 is a flowchart diagram indicating the operation (abnormal point detection process) of an image inspection apparatus according to a third example of the present invention.
Figure 12:
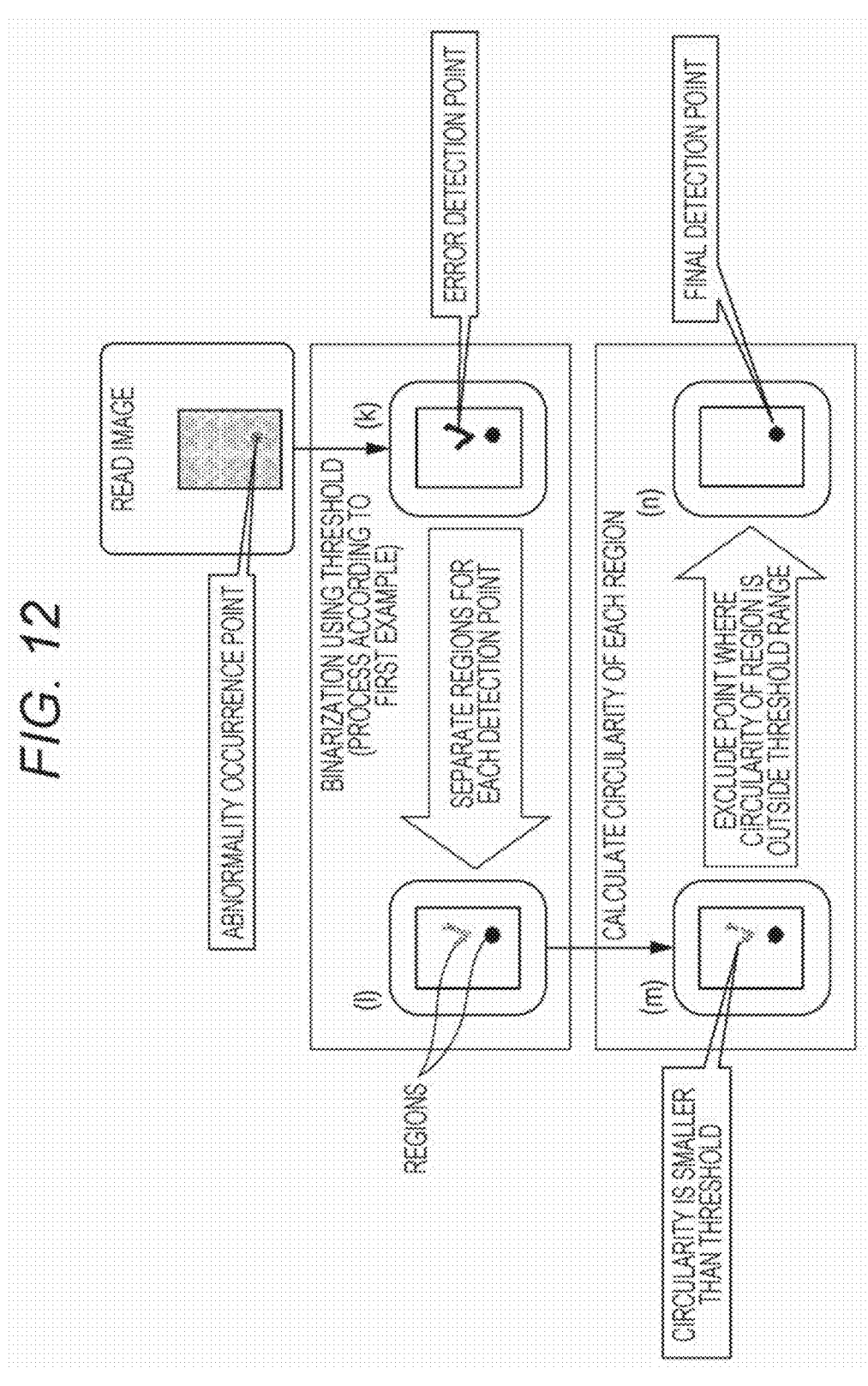
FIG. 12 is a schematic diagram illustrating an image inspection method according to the third example of the present invention.

Next, an image inspection apparatus, an image inspection method, and an image inspection program according to a third example of the present invention will be described with reference to FIGS. 11 and 12. FIG. 11 is a flowchart indicating the operation of the image inspection apparatus of the present example, and FIG. 12 is a schematic diagram illustrating the image inspection method of the present example.

The above-described second example indicates an example in which the detection portion is excluded by the area. However, as a case where erroneous detection occurs, an abnormality having a shape different from that of an abnormality to be detected may be detected. For example, in the case where the abnormality to be detected is a spot-like abnormality caused by a firefly phenomenon, streaks or the like caused by optics may be erroneously detected.

To avoid such erroneous detection, in the present example, the detection points are narrowed based on the degree of the circularity. In that case, the configuration of an image inspection apparatus 20 is the same as that of the first example described above, but a control unit 21 (abnormal point detector 31) separates the region for each detected abnormal point and calculates the circularity of each region, and an abnormal portion where the calculated circularity deviates from a threshold set according to a specific abnormality (for example, an abnormality based on a firefly phenomenon) is excluded from the detection result to narrow down the abnormal point.

Hereinafter, the specific operation of the image inspection apparatus 20 of the present example will be described with reference to FIGS. 11 and 12. A CPU 21a executes processing of each step indicated in the flowchart of FIG. 11 by developing the image inspection program stored in a ROM 21b or a storage 22 on a RAM 21c and executing the program. FIG. 11 shows a specific example of the abnormal point detection process of S104 of FIG. 5 of the first example.

First, as in the first example, the control unit 21 (exclusion process unit 28) detects an edge having a relatively high contrast from the original image, and identifies a region near the edge, and excludes the region near the edge from an abnormal portion detection target (S401). Next, the control unit 21 (filter process unit 29) performs a predetermined filter process on the original image after the exclusion process to generate a reference image (S402). Next, the control unit 21 (comparison process unit 30) compares the original image with the reference image to generate a comparison image (S403). Next, the control unit 21 (abnormal point detection unit 31) sets a threshold for each position using a comparison image obtained from the original image (S404), and detects an abnormal point by processing (binarizing) a comparison image generated from a read image by using the set threshold (S405, refer to FIG. 12(*k*)).

Next, the control unit 21 (abnormal point detection unit 31) separates the region for each detected point (S406, refer to FIG. 12(*l*)), and calculates the circularity of each region (S407, refer to FIG. 12(*m*)), excludes, from the detection result, the abnormal portion where the calculated circularity deviates from the threshold set according to the specific abnormality (for example, the abnormality caused by the firefly phenomenon), and narrows down the abnormal portion (S408, refer to FIG. 10(*n*)). The degree of circularity is the ratio of the area of the actual region to the area of the circle determined by the maximum distance from the center pixel of that area (the ratio of the area of the region to the area of the above circle, the value is 0 to 1), and it is 1 in the case of a true circle.

For example, in the case where the abnormality to be detected is a spot-like abnormality caused by a firefly phenomenon, the influence range of the firefly phenomenon becomes nearly circular, considering the generation principle. Therefore, in view of the feature, circularity is set as a threshold, and by excluding a region where the circularity deviates from the threshold (for example, the region having a circularity of 0.5 or less), an abnormality other than an abnormality caused by a firefly phenomenon is prevented from being erroneously detected.

Note that, in this case, after detecting the abnormal portion using a threshold set based on the comparison image obtained from the original image, the abnormal portion is narrowed down using the circularity threshold, but when there is no content having the frequency component equivalent to that of the abnormality to be detected in the original image, after detecting an abnormal portion using a predetermined threshold (for example, a fixed threshold), the abnormal portion may be narrowed down using the circularity threshold.

Note that, the present invention is not limited to the description of each of the above-described examples, and the configuration and control can be appropriately changed without departing from the spirit of the present invention.

For example, the first example describes the case of using the threshold set based on the comparison image obtained from the original image, the second example describes the case of using the area threshold set according to the abnormality to be detected, and the third example describes the case of using the circularity threshold set according to the abnormality to be detected, but these can be arbitrarily combined.

The present invention is applicable to an image inspection apparatus for inspecting a read image, an image inspection method in the image inspection apparatus, an image inspection program operating in the image inspection apparatus, and a recording medium recording the image inspection program.

According to an embodiment of the present invention, it is possible to reliably detect a specific abnormality by narrowing down the abnormal portion using the threshold (the circularity threshold) set according to the abnormality to be detected.

The reason is that, in the image inspection apparatus including an image reader that reads an original image formed on a recording material based on a print job and generates a read image, and a control unit that analyzes the read image and performs an image inspection, the image inspection apparatus acquires a read image from the image reader, detects an edge from the read image, excludes a region near an edge from an image inspection target, performs a predetermined filter process on the read image after the exclusion process to generate a first reference image, extracts a difference between the read image after the exclusion process and the first reference image to generate a first comparison image, binarizes the first comparison image using a predetermined threshold to detect points where a specific abnormality has occurred, and outputs a detection result.

Although embodiments of the present invention have been described and illustrated in detail, the disclosed embodiments are made for purposes of illustration and example only and not limitation. The scope of the present invention should be interpreted by terms of the appended claims

What is claimed is:

1. An image inspection apparatus comprising a hardware processor that acquires a read image obtained by reading a recording material on which an image is formed, compares the read image with a reference image, calculates a circularity for a region where a difference is extracted by comparison, and detects, based on the calculated circularity, a region in which a degree of circularity indicating a closeness to a true circle exceeds a predetermined value as an abnormality in the read image, wherein the hardware processor binarizes using a predetermined threshold for the region where the difference is extracted to detect the abnormality, wherein the hardware processor sets the threshold using a second reference image generated on the basis of an original image formed on the recording material.

2. The image inspection apparatus according to claim 1, wherein the reference image is an image generated by performing a predetermined filter process on the read image.

3. The image inspection apparatus according to claim 1, wherein the reference image is an image generated by performing a blurring process on the read image.

4. The image inspection apparatus according to claim 1, wherein the hardware processor generates a comparison image on the basis of the comparison between the read image and the reference image, and binarizes the comparison image to detect the abnormality.

5. The image inspection apparatus according to claim 1, wherein the hardware processor detects an edge from the read image, excludes a region near the edge from a detection target of the abnormality, and compares the read image excluding the region near the edge with the reference image generated on the basis of the read image excluding the region near the edge.

6. The image inspection apparatus according to claim 1, wherein the second reference image is an image generated by performing a predetermined filter process on the original image.

7. The image inspection apparatus according to claim 1, wherein the second reference image is an image generated by performing a blurring process on the original image.

8. The image inspection apparatus according to claim 1, wherein the hardware processor sets the threshold on the basis of difference information extracted on the basis of comparison between the original image and the second reference image.

9. An image inspection method comprising:
  acquiring a read image obtained by reading a recording material on which an image is formed,
  comparing the read image with a reference image,
  calculating a circularity for a region where a difference is extracted by comparison,
  detecting, based on the calculated circularity, a region in which a degree of circularity indicating a closeness to a true circle exceeds a predetermined value as an abnormality in the read image,
  binarizing using a predetermined threshold for the region where the difference is extracted to detect the abnormality, and
  setting the threshold using a second reference image generated on the basis of an original image formed on the recording material.

10. The image inspection method according to claim 9, wherein the reference image is an image generated by performing a predetermined filter process on the read image.

11. The image inspection method according to claim 9, wherein the reference image is an image generated by performing a blurring process on the read image.

12. The image inspection method according to claim 9, further comprising generating a comparison image on the basis of the comparison between the read image and the reference image, and binarizing the comparison image to detect the abnormality.

13. The image inspection method according to claim 9, further comprising
  detecting an edge from the read image, excluding a region near the edge from a detection target of the abnormality, and
  comparing the read image excluding the region near the edge with the reference image generated on the basis of the read image excluding the region near the edge.

14. The image inspection method according to claim 9, wherein the second reference image is an image generated by performing a predetermined filter process on the original image.

15. The image inspection method according to claim 9, wherein the second reference image is an image generated by performing a blurring process on the original image.

16. The image inspection method according to claim 9, wherein the hardware processor sets the threshold on the basis of difference information extracted on the basis of comparison between the original image and the second reference image.

17. A non-transitory computer readable medium encoded with a program for having a hardware processor execute an image inspection method comprising:
  acquiring a read image obtained by reading a recording material on which an image is formed,
  comparing the read image with a reference image,
  calculating a circularity for a region where a difference is extracted by comparison,
  detecting, based on the calculated circularity, a region in which a degree of circularity indicating a closeness to a true circle exceeds a predetermined value as an abnormality in the read image,
  binarizing using a predetermined threshold for the region where the difference is extracted to detect the abnormality, and
  setting the threshold using a second reference image generated on the basis of an original image formed on the recording material.

18. The non-transitory computer readable medium according to claim 17, wherein the reference image is an image generated by performing a predetermined filter process on the read image.

19. The non-transitory computer readable medium according to claim 17, wherein the reference image is an image generated by performing a blurring process on the read image.

20. The non-transitory computer readable medium according to claim 17, further comprising generating a comparison image on the basis of the comparison between the read image and the reference image, and binarizing the comparison image to detect the abnormality.

21. The non-transitory computer readable medium according to claim 17, further comprising
  detecting an edge from the read image, excluding a region near the edge from a detection target of the abnormality, and
  comparing the read image excluding the region near the edge with the reference image generated on the basis of the read image excluding the region near the edge.

22. The non-transitory computer readable medium according to claim 17, wherein
  the second reference image is an image generated by performing a predetermined filter process on the original image.

23. The non-transitory computer readable medium according to claim 17, wherein
  the second reference image is an image generated by performing a blurring process on the original image.

24. The non-transitory computer readable medium according to claim 17, wherein
  the hardware processor sets the threshold on the basis of difference information extracted on the basis of comparison between the original image and the second reference image.

* * * * *